April 11, 1950 W. LYONS 2,503,957

DIVERSITY RECEIVER SYSTEM

Filed Feb. 20, 1945 2 Sheets-Sheet 1

INVENTOR.
Walter Lyons
BY
H.S. Grover
ATTORNEY.

INVENTOR.
Walter Lyons
BY H. S. Grover
ATTORNEY.

Patented Apr. 11, 1950 2,503,957

UNITED STATES PATENT OFFICE 2,503,957

DIVERSITY RECEIVER SYSTEM

Walter Lyons, Wenonah, N. J., assignor to Radio Corporation of America, a corporation of Delaware Application February 20, 1945, Serial No. 578,877

14 Claims. (Cl. 250—20)

Figure 1:
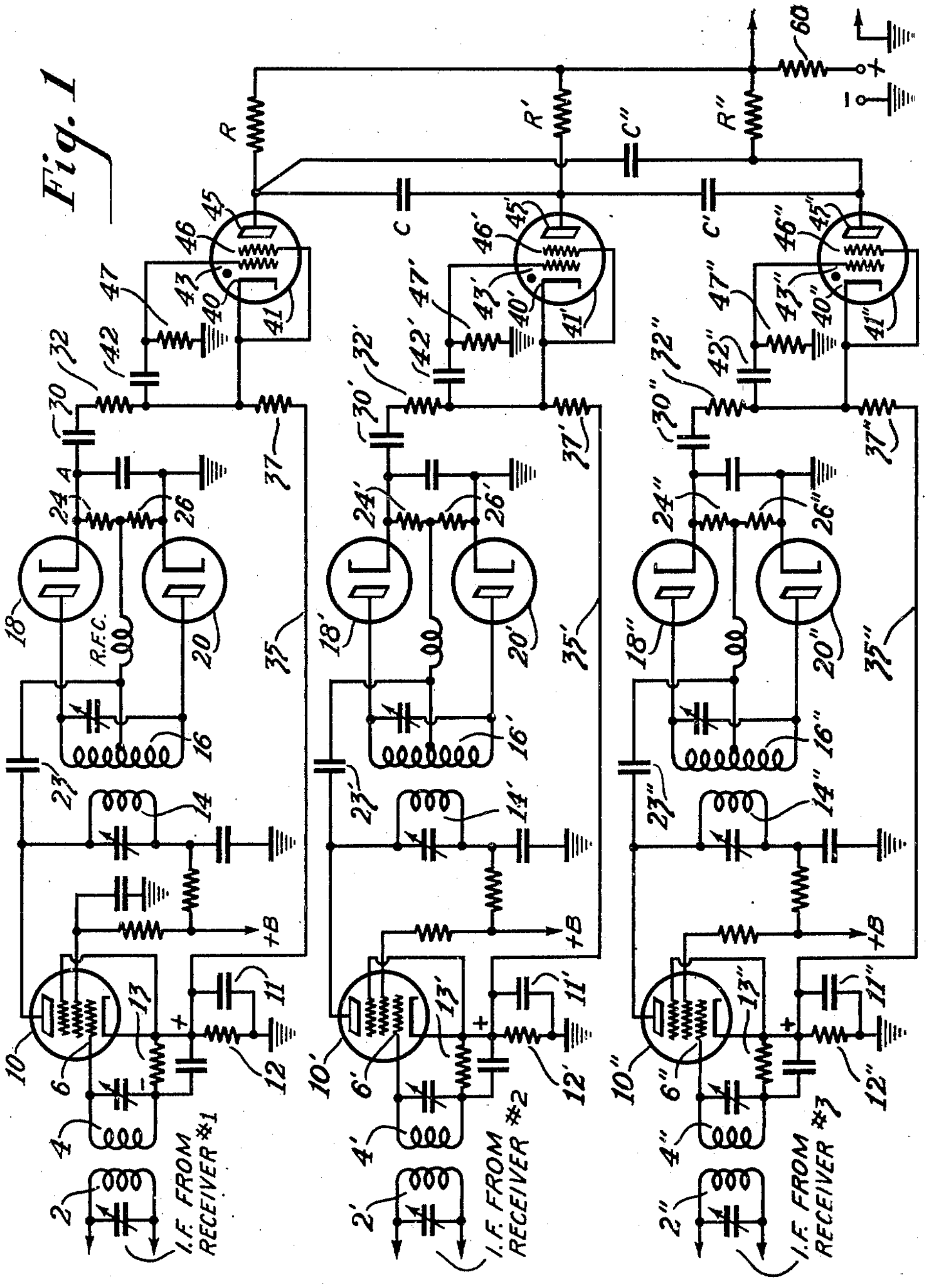

This application relates to diversity systems in general and in particular to diversity receivers of the type wherein means is provided at the various receivers to use only the best received signal and render the receivers responding to weaker signals ineffective to contribute to the output.

The main general object of my invention is to reduce or eliminate fortuitous distortion in diversity reception of telegraphy and similar signals of pulse wave form. By the term fortuitous distortion, I mean elongation of the signal pulse due to reception of a signal pulse over two or more paths of differing lengths resulting in effectively adding a time increment to the pulse as received.

An additional object of my invention is to reduce so-called frequency discriminating fading by reducing the number of signals contributing at any one time, and to have greater control vested in the signal carrier. This object is attained by having the signal with the strongest carrier take more positive control than has been possible heretofore.

In the embodiment discussed three receivers are arranged in triple diversity. The receiver outputs are to be so used that recording or similar means is controlled by the strongest signal which also renders ineffective the channels wherein weaker signals appear.

Diversity systems wherein the strongest signal takes over control broadly are known in the art and are in general operative. However, control in some cases is not satisfactory. A primary object of my invention is improved control of the system by the strongest signal. To do this I provide an improved three-way trigger circuit, a triple flip flop circuit, that is, a three-way electronic toggle switch, switching the outputs of each of the three receivers and rendering ineffective those receivers getting the weaker signals. In general, it might be said that this object is attained by building hysteresis in a switching circuit, that is, by having a difference in control required to switch "on" and to switch "off." In the improved system illustrated, three gas tubes such as, for example, Thyratron tubes with grids, are arranged so that that one excited by the strongest carrier if flipped on, in turn flips off the other two tubes. The tube flipped on then supplies the used output. Thus the number of paths over which the signal is received is reduced and fortuitous distortion is reduced. In so far as I know, gas tubes have never been used in this manner before. This perhaps is because of the difficulties that one encounters due to the low impedance of gas tubes, together with loss of control thereof after they start firing.

My invention is applicable to intensity modulation or frequency modulation systems, but in the embodiment described it is assumed that telegraphy signals of the type known as frequency shift signals are being received. In these signals the mean frequency of a carrier is shifted in accordance with code from a first frequency designated "mark" to a second frequency separated therefrom and designated "space," and vice versa. The signals have characteristics of off-on telegraphy, but may be considered frequency modulated signals since the frequency thereof shifts between two values in accordance with the signals.

Figures 2, 3:
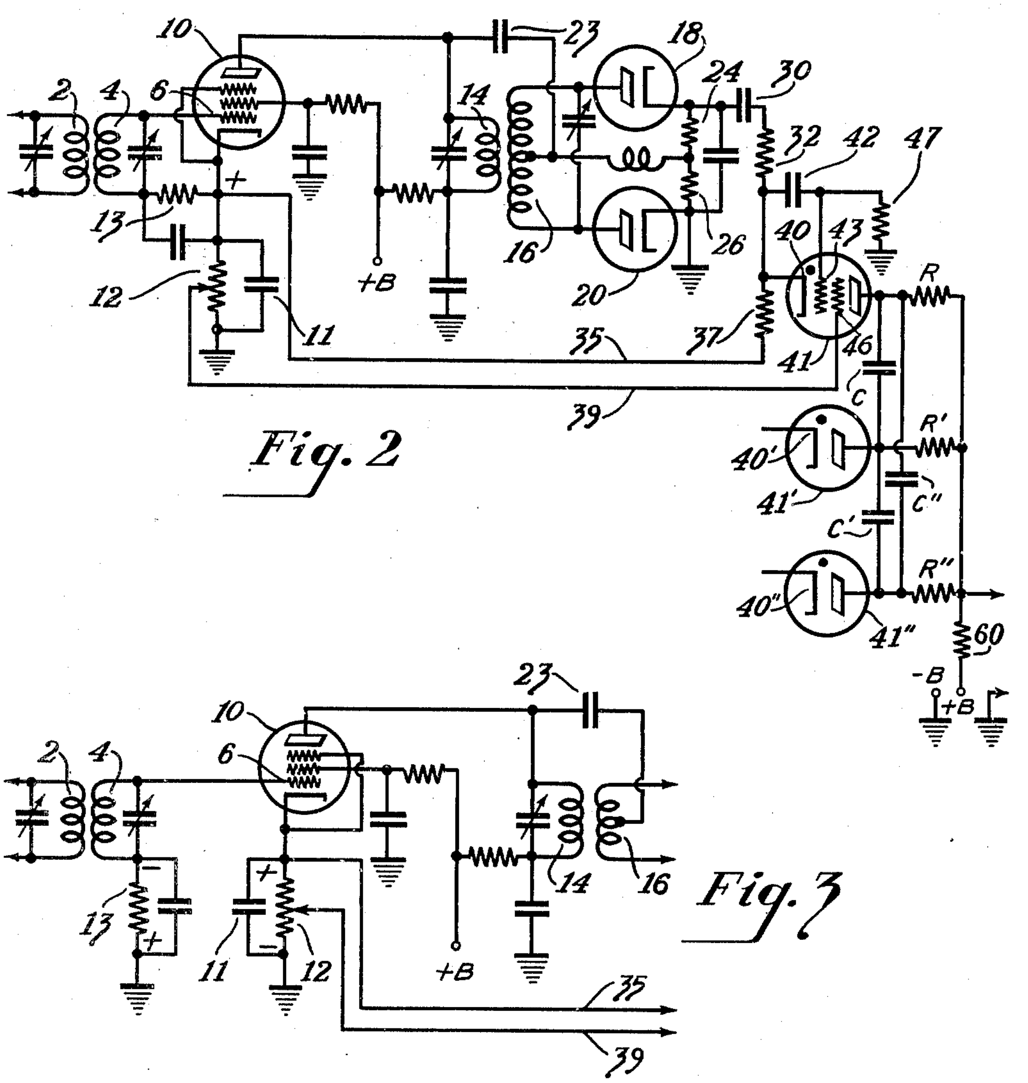

In describing my invention in detail, reference will be made to the attached drawings wherein Fig. 1 illustrates the essential details of the intermediate frequency circuit connections of three wave receivers in a diversity system arranged in accordance with my invention, Fig. 2 is a modification of the arrangement of Fig. 1; while Fig. 3 is a modification of the arrangements of Figs. 1 and 2.

In known diversity systems a plurality of receivers, say three, are excited by current developed in spaced or polarized aerials. Usually the receivers each have radio frequency amplifiers, a local oscillator or oscillators, first detectors, and intermediate frequency amplifiers followed by signal detecting combining and recording apparatus. I make use of receivers in which the elements described above may be conventional except certain features of the I. F. amplifier and circuits following the same described in detail hereinafter. The radio amplifiers, first mixers, etc., have been omitted from the description and drawings in the sake of brevity.

Intermediate frequency outputs from three antenna radio frequency amplifiers, etc., #1, #2 and #3, are supplied to the primary winding of intermediate frequency transformers 4, 4′ and 4″. To further simplify the disclosure, the novel features of the illustrated portion of receiver #1 will be described. The description thereof applies equally well to the other receivers and similar reference numerals primed and double primed are used to designate the elements in channels #2 and #3 respectively.

The intermediate frequency energy is supplied to the input grid 6 of a limiter tube stage 10, which in turn is used to drive a discriminator and detector operating at the intermediate frequency. The input circuits 2 and 4 are tuned to the frequency of the intermediate frequency energy supplied to the circuit 2. The cathode of tube 10 is connected to ground by a cathode biasing resistor 12 shunted by a radio frequency bypass condenser 11, while the grid direct current circuit includes a resistor 13 shunted by a radio frequency bypassing condenser. On the application of signals a potential is developed in resistor 12 and in resistor 13 depending upon the signal strength. The negative potential developed in resistor 13 due to grid rectification is proportional to the signal strength, while for reasons pointed out in detail hereinafter, the positive potential developed in resistor 12 is inversely proportional to the signal strength.

The anode of the tube is connected to a tuned circuit 14. The inductance of the tuned circuit 14 is coupled to the inductance of a tuned circuit 16 the terminals of which are connected to diodes 18 and 20. A point on the inductance of the tuned circuit 16 is connected by a radio frequency choke RFC to a point between resistances 24 and 26, between the cathodes of the diodes 18 and 20. The condenser 23 connects the high potential end of tuned circuit 14 to a point on the inductance 16 to thereby couple tuned circuit 14 in parallel to the anodes of diodes 18 and 20 which are also inductively coupled to tuned circuit 14 by tuned circuit 16 in pushpull relation. This discriminator operates in a well known manner as disclosed in Seeley Patent #2,121,103 to produce across resistances 24 and 26 at the point A a potential which varies above or below about zero potential an amount depending upon whether the frequency of the intermediate frequency energy applied to the circuits 14 to 16 is above or below the resonant frequency of these circuits. In the embodiment described, this energy is keyed from a first frequency on one side of the resonant frequency to a second frequency on the other side of the resonant frequency as described above.

The output of this discriminator appearing at the point A may be treated as alternating current and this point is connected by an alternating current circuit including condenser 30 and resistance 32 to the cathode 40 of a tetrode Thyratron valve 41.

The alternating current signal appearing at the point A is prevented from firing the tube 41 by inclusion of a condenser 42 between the control grid 43 of this tube and the cathode 40. If the tube 41 is extinguished changes in the cathode potential due to the alternating current fed thereto by resistance 32 are also applied by condenser 42 to the control grid 43 so that the potential difference between the grid 43 and the cathode 40 does not materially change and the tube remains extinguished.

The cathode 40 of tube 41 is also connected to the cathode resistor 12 of the limiter stage 10 in order to receive the potentials developed therein to strike or ignite the tube 41 when the potentials on the cathode grid and anode of tube 41 are properly related. This connection 35 includes a resistor 37 which serves to prevent shorting the signal potential applied to grid 43 to ground by the capacitor 11 across resistance 12. Ignition of the tube 41 causes the detected signal from the discriminator appearing at point A to be supplied to the load circuit 60. The anode 45 of tube 41 is connected by resistance R and load impedance 60 to the positive terminal of a direct current source the negative terminal of which is grounded. The anodes 45, 45′ and 45″ are each coupled to the other by condensers C, C′ and C″. The control grid 43 is connected to ground by resistance 47 to have essentially ground potential in order that the effective bias potential between grid 43 and the cathode 40 of tube 41 is such that the grid is always negative with respect to the cathode.

The firing potential in each channel, i. e., the positive potential applied from resistance 12 to the cathode 40 by lead 35 and resistance 37 is inversely proportional to the received carrier strength due to the negative potential built up across resistor 13 in the grid circuit by grid circuit rectification. The higher the signal applied in the circuit 2 the higher the negative potential on the grid 6. This serves to more or less decrease the plate current in tube 10 as the signal amplitude increases, thus reducing current through resistor 12 and the positive potential developed across cathode resistor 12 and appearing at the cathode of tube 41. The potential across resistor 12 is applied to the cathode 40 of the tube 41 as a striking or igniting potential. As the signal strength increases the potential at 12 falls as described above and the potential at 40 falls. This in turn results in effectively making the potential of the grid 43 of gas tube 41 less negative and the tube strikes and passes signal to the load 60. Obviously, the channel receiving the strongest signal and applying the same to the tube 10 or 10′ or 10″ will strike its Thyratron gas tube first. The characteristics of these gas tubes is such that the grid potential no longer controls discharge once the tube is fired.

Similar connections are made in the additional channels #2 and #3 including tubes 41′ and 41″. The anodes 45, 45′ and 45″ of the tubes 41, 41′ and 41″ are mutually interconnected by the capacitors C, C′ and C″, the charging currents of which serve to blow out the discharges in the two tubes having higher control potentials impressed on their respective cathodes. Assume, for example, that the tube 41 has been struck and conducts current through the resistor R. The potential at the anode 45 end of this resistance R drops because of the heavy current flowing in R and this permits the condenser C and the condenser C″ to discharge the high direct current potential at anodes 45″ and 45′ so that current flows through resistances R′ and R″ and condensers C″ and C′ through the impedance of tube 45 to lower the potentials on the anodes 45′ and 45″ to a point at which these tubes in the channels then receiving weaker signals are maintained extinguished or if ignited are blown out.

A portion of the total plate loads of the three Thyratrons 41, 41′ and 41″ is a common impedance 60 across which the signal due to the strongest channel is available for output.

It may be desirable to connect grid 46, i. e., the shield grid to some point on resistance 12 by a lead 39 as shown in Fig. 2 instead of to the cathode of tube 41 as shown in Fig. 1, to adjust the threshold value or firing point of tubes 41, 41′ and 41″. This connection also provides a convenient means to relatively adjust the potential of the three shield grids 46, 46′ and 46″ in order that tubes 41, 41′ and 41″ may be given similar operating characteristics if they do not inherently have such characteristics.

Making the grid 46 more negative reduces the value of the effective negative potential on the grid 43 at which firing of the Thyratron takes place. Increasing the negative potential on the shield grid 46 will require the control grid to be more positive, i. e., less negative before firing takes place, and this in turn requires a stronger signal on cathode 40 for firing the tube. When considering this operation keep in mind that the potential across resistance 12 is inversely proportional to the received signal strength.

The embodiment of Fig. 3 includes features of Figs. 1 and 2. The grid leak resistor 13 is connected to ground instead of to the cathode of tube 10 as in Figs. 1 and 2. The operation of this part of this alternative embodiment to accomplish limiting in tube 10 and supply the control potential by lead 35 to the cathode 40 of the gate tube 41 is as in Figs. 1 and 2. Lead 39 serves the purpose of lead 39 in Fig. 2.

In the description given above it is said that the alternating currents to be passed by the tubes 41, 41′ and 41″ are applied to the tube cathodes 40, 40′ and 40″ respectively, and that to prevent this alternating current from firing the tubes alternating currents of like phase are fed to the control grids 43, 43′ and 43″ respectively. Once a tube is fired its internal impedance is very low and it is correct to say that alternating current fed to the grids as well as alternating current fed to the cathodes are passed by the tubes. It will be obvious then that the alternating currents to be relayed may be applied to the grids while alternating currents may then be also applied to the cathodes to prevent the tubes from firing except as controlled or gated by the direct current potentials developed in the resistances 12, 12′ and 12″. Moreover, it is seen that the firing potentials applied to the cathodes fire the tubes because the cathodes become less positive as the carrier intensity grows, which is the same as making the grids less negative. The potentials developed across the resistances 12, 12′ and 12″ may be said to control the direct current potentials on the grids 43, 43′ and 43″. If desired the connections to the tubes 10, 10′ and 10″ may be arranged to provide negative potentials which decrease with an increase in carrier strength, and use these potentials to control the potentials on the grids 43, 43′ and 43″.

As brought out in the specification the carrier of greatest intensity provides the best signal when demodulated and this signal is selected and passed along by using as the gating potentials the direct current developed in resistances 12, 12′ and 12″. These potentials are about inversely proportional to their carrier intensities, and it may also be said that these potentials are likewise about inversely proportional to the average amplitude of the alternating currents representing the signals and derived by demodulating the received carriers when the same are modulated in amplitude at the transmitter and detected by amplitude modulation detectors at the receivers, which alternating currents are applied to the grids and/or cathodes of the tubes 41, 41′ and 41″.

What is claimed is:

1. In apparatus for relaying a selected one of a plurality of alternating currents, a plurality of gaseous discharge devices each having an anode, a cathode, and a control grid, there being a device for each of said currents, a single source of positive direct current potential connected with the anodes of all of the devices, means for applying each of said alternating currents to be relayed to the cathode of the device therefor, means for applying an appropriate bias to the control grid of each device, a source of control potential the value of which is variable for each device, and a connection from each of said last named sources to the cathode of each respective one of the devices to apply control potential from each source to a corresponding cathode as a firing potential.

2. Relaying apparatus as recited in claim 1 wherein the anodes of the devices are each connected to said direct current source by a resistance and the anode of each device is coupled to the anode of the other devices by a condenser to prevent discharge through the remaining devices when one thereof is fired.

3. In apparatus for selecting and relaying one of a plurality of alternating currents, a plurality of gaseous discharge tubes each having an anode, a cathode, and a control grid, there being a tube for each current to be relayed, a single source of positive direct current potential connected with the anode of each tube, means for applying each of said alternating currents to be relayed to the cathode of the tube therefor, means for applying an appropriate bias to the control grid of each tube, a source of control potential the value of which is variable for each tube, a connection from each of said last named sources to the cathode of each respective one of the tubes to apply control potential from each source to the cathode of a corresponding tube as a firing potential, and means for applying each one of the alternating currents to be relayed to the control grid of the corresponding tube to prevent application thereof to the tube's cathode from firing the tube.

4. Apparatus as recited in claim 3 wherein the anodes of the tubes are each connected to said direct current source by a separate resistance and wherein the anode of each tube is coupled to the anodes of the remaining tubes by a condenser.

5. In a diversity receiver system, a plurality of incoming signal channels, a plurality of electron discharge devices each having a control grid and anode and a cathode, there being a device for each channel, each device being excited by the signal in its channel, a plurality of tubes of the gaseous discharge type, each having a control electrode, a cathode and an output electrode, there being a tube for each channel, an output circuit coupled to the output electrodes of all of said tubes, translating means coupling the anode of each device to the cathode of the tube in the corresponding channel to supply translated electrical wave energy from the device to the corresponding tube in each channel, means connecting each of said devices to operate as a limiter stage, whereby a positive potential which is about inversely proportional to the strength of the wave energy in each channel is developed across a resistance in the anode-cathode path of each corresponding one of said devices in the respective channels, a connection to the control grid of each of the said tubes for holding the same at the desired operating potential, a connection from said resistance in each channel to the cathode of the corresponding tube in such channel to apply thereto a firing potential, and condensers interconnecting the anodes of the said tubes so that when one thereof is fired the others are extinguished.

6. In a diversity receiver system, a plurality of incoming signal channels, a plurality of electron discharge devices each having a control grid and anode and a cathode, there being a device for each channel, each device being excited by the signal in its channel, a plurality of tubes of the gaseous discharge type, each having a control electrode, a cathode and an output electrode, there being a tube for each channel, an output circuit coupled to the output electrodes of all of said tubes, translating means coupling the anode of each device to the cathode of the tube in the corresponding channel to supply translated electrical wave energy from the device to the corresponding tube in each channel, means connecting each of said devices to operate as a limiter stage, whereby a positive potential which is about inversely proportional to the strength of the wave energy in each channel is developed across a resistance in the anode-cathode path of each corresponding one of said devices in the respective channels, a connection to the control grid of each of the said tubes for holding the same at the desired operating potential, a connection from said resistance in each channel to the cathode of the corresponding tube in such channel to apply thereto a firing potential, means for preventing the translated wave energy applied to the cathode of the tube in each channel from firing the same, and condensers interconnecting the anodes of the said tubes for preventing the remaining tubes from firing when one thereof is fired.

7. Apparatus as recited in claim 1 including means actuated by the firing of one of said devices to prevent firing of the remaining devices.

8. In apparatus for relaying a selected one of a plurality of alternating currents, a plurality of gaseous discharge devices each having an anode, a cathode, a control grid and a screen grid adjacent the anode, there being a device for each of said currents, a single source of positive direct current potential connected with the anodes of all of the devices, means for applying each of said alternating currents to be relayed to the cathode of the corresponding device, means for applying an appropriate bias to the control grid of each device, a source of control potential the value of which is variable for each device, a connection from each of said last named sources to the cathode of each respective one of the devices to apply control potential from each source to a corresponding cathode as a firing potential, and means for maintaining said screen grid at a potential less than the potential of said anode.

9. Apparatus as recited in claim 8 wherein said screen grid is connected to an adjustable potential source.

10. Apparatus as recited in claim 3 including means actuated by the firing of one of said tubes to prevent firing of the remaining tubes.

11. Apparatus as recited in claim 3 wherein each of said gaseous discharge tubes includes a screen electrode adjacent the anode, and wherein each screen electrode is connected to an adjustable potential source.

12. In apparatus for selecting the best of a plurality of alternating currents derived by demodulating carrier currents received over several paths and for repeating the selected alternating current: a plurality of gaseous discharge tubes each having an anode and having input electrodes including a cathode and a control electrode, there being a tube for each path; a common output impedance and a source of positive direct potential connected with the anodes of all of the tubes; separate connections for applying the said alternating current in each path to one input electrode of the tube for that path; connections for applying the alternating current in each path to the other input electrode of the tube for that path, to prevent application thereof to said one input electrode from firing the tube; separate limiter means electrically connected in each path for producing across a separate corresponding impedance electrically coupled thereto a potential about proportional to the strength of the carrier current from which the alternating current in that path is derived; a connection from each of the last-named separate impedances to an input electrode of a separate one of said tubes, corresponding to that path in which the corresponding limiter means is connected, to apply each produced potential to a corresponding tube as a breakdown or firing potential therefor; a direct current circuit for applying an appropriate bias to the control electrode of each tube; and reactive elements, coupling the anode of each tube to the anodes of each of the remaining tubes, operative when one tube fires to prevent the remaining tubes from firing and to extinguish the remaining tubes if they are already fired when said one tube is fired.

13. In apparatus for selecting the strongest of a plurality of alternating currents derived by demodulating carrier currents received over several paths and for repeating the selected alternating current: a gaseous discharge tube for each path, each tube having an anode, a cathode and a control electrode; a common output impedance and a source of positive direct potential connected with the anodes of all of the tubes; separate connections for applying the said alternating current in each path to the cathode of the tube for that path; connections for applying the alternating current in each path to the control electrode of the tube for that path, to prevent application thereof to the cathode of the same tube from firing the tube; separate limiter means electrically connected in each path for producing across a separate corresponding impedance electrically coupled thereto a positive potential about inversely proportional to the strength of the carrier current from which the alternating current in that path is derived; a connection from each of the last-named separate impedances to the cathode of a separate one of said tubes, corresponding to that path in which the corresponding limiter means is connected, to apply each produced potential to a corresponding tube as a breakdown or firing potential therefor; means for applying an appropriate bias to a control electrode of each tube; and condensers, coupling the anode of each tube to the anodes of each of the remaining tubes, operative when one tube fires to prevent the remaining tubes from firing and to extinguish the remaining tubes if they are already fired when said one tube is fired.

14. In a signalling system: a plurality of incoming signal channels; a plurality of electron discharge devices, there being a device for each channel, each device having input electrodes connected to be excited by signal modulated wave energy in its channel and having output electrodes; a resistance connected in series with the output electrodes of each device; means connecting each of said devices to operate as a limiter stage, whereby a potential which depends on the strength of the wave energy in each channel is developed across each corresponding resistance; a modulated wave demodulator coupled to the electrodes of each device; a tube valve coupled to each demodulator; a common load coupled to all of the tube valves; and a biasing circuit for each tube valve coupling an electrode of each such valve to a corresponding one of said resistances.

WALTER LYONS.

REFERENCES CITED

The following references are of record in the file of this patent:

UNITED STATES PATENTS

| Number | Name | Date |
|---|---|---|
| 2,055,309 | Ramsey | Sept. 22, 1936 |
| 2,136,621 | King | Nov. 15, 1938 |
| 2,253,832 | Whitaker | Aug. 26, 1941 |
| 2,253,867 | Peterson | Aug. 26, 1941 |
| 2,273,978 | Montgomery | Feb. 24, 1942 |
| 2,275,027 | Bell | Mar. 3, 1942 |